June 15, 1943.    J. OGDEN ET AL    2,322,052
WELD ANALYZER
Filed Sept. 21, 1940
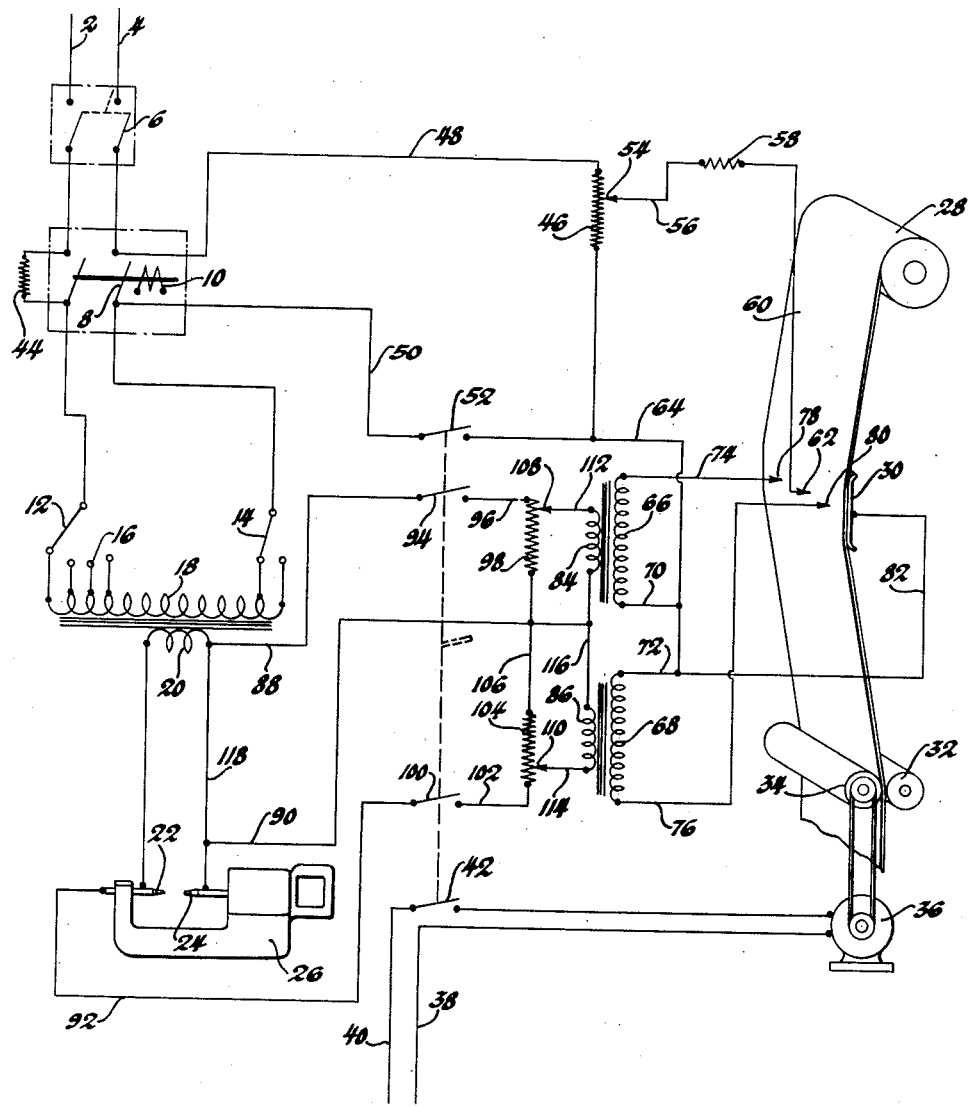
Inventors
Jack Ogden &
Harold B. Wilkins
By Blackmore, Spencer & Flint
Attorneys Patented June 15, 1943

2,322,052

UNITED STATES PATENT OFFICE 2,322,052

WELD ANALYZER

Jack Ogden, Huntington Woods, and Harold B. Wilkins, Detroit, Mich., assignors to General Motors Corporation, Detroit, Mich., a corporation of Delaware Application September 21, 1940, Serial No. 357,795

4 Claims. (Cl. 219—4)

This invention relates to timing devices and more specifically to electrical equipment for measuring small time increments. There are at the present time many machines or devices which operate through the various portions of their complete cycle in very small increments of time and in many of these instances the exact timing of each portion of the cycle is essential to a proper and correct operation of the machine. It is necessary to check these machines at certain regular intervals so that the timing of the various portions may be corrected to maintain the machine always in the proper operating condition. Some of the devices utilized in the past for measuring such time intervals have been designed in such a manner that it is necessary to interrupt the normal operation of the machine in order to obtain the proper tests and timing intervals.

It is an object of our invention to provide a system for measuring small increments of time in normal machine cycle operation.

It is a further object of our invention to provide such a system that may be connected to the machine without disrupting the normal operating circuit thereof.

It is a still further object of our invention to provide a compact simple device which may be readily carried from place to place and give quick and accurate results of the measurement of the necessary times.

With these and other objects in view, our invention will be best understood by reference to the following specification and claims and the illustration in the accompanying drawing, in which:

The figure is a circuit diagram of a system embodying our invention.

While, as above indicated, there are numerous instances in which it is desired to measure small increments of time in the normal cycle of operation of a machine, we have in this instance shown the system as applied to a welding machine. It is to be understood that this is merely illustrative of one of the many uses thereof and should not be interpreted as meaning any limitation on the general scope and use of our invention.

Referring now specifically to the figure, there is therein shown an incoming power line 2—4 in which there is provided a conventional switch 6 for cutting off the machine from the source of power. This is next connected to a magnetically operated switch 8 which is controlled by the welding control system to provide a series of welds on any desired material, said switch being operated by a small magnetic coil 10. The incoming lines are then connected to a plurality of movable members 12 and 14 which may be set on any one of a plurality of taps 16 on the primary coil 18 of the transformer, the secondary 20 of which is connected directly across a pair of welding electrodes 22, 24 which are supported in a suitable machine arm 26. In this manner when the two switches 6 and 8 are closed a high current is applied across the welding electrodes, and, if they are set in proper position with work therebetween, a weld is formed. The taps 16 are used to adjust to give the desired output of the transformer.

The portion so far described is merely the conventional welding system and forms no part of the present invention. It might be mentioned at this point that a welding machine goes through a complex cycle comprising, generally, four periods of time. First, an "off" time during which the electrodes are open and no work is in place and the welding circuit is open; second, a "delay" time during which work is placed between the electrodes and they are clamped together, but no current is applied; third, a "weld" time during which a current is applied to the welding points and of necessity the material therebetween and during which period the material is heated to a molten state and the weld made; and, fourth, a "hold" time during which the welding current is off but the material still remains clamped between the welding electrodes to allow the same to cool before the work is taken therefrom.

It has been found very necessary in present welding apparatus to maintain the times for each portion of the cycle within very close limits and therefore this has been taken as an example as a machine which it is desired to test for time intervals.

There is provided a roll of sensitive paper 28 which is led over a metallic backing plate 30 and then through a pair of feeding rollers 32—34 which pull the sensitive paper over the backing plate for the various recordings thereon. As the paper feeds from the rollers it may be read or examined by the operator and at the end of a test run may be torn or cut apart to give a permanent record. The feeding roll 34 is driven by a small motor 36 which is provided by current from a separate source through lines 38 and 40, there also being provided in line 40 a switch 42 to turn on and off said motor.

Switch 8 in the incoming line for the welding machine is a single or two-pole, single-throw switch and across one pair of contacts there is provided a resistor 44 which will allow a small amount of current to bypass the switch when the same is open for purposes to be described. There is also connected across the opposite set of terminals a second resistor 46 by connection thereto through lines 48 and 50, line 50 having therein a switch 52 to open and close this circuit when desired. Resistor 46 has a movable tap 54 arranged therewith whereby it may be moved along the surface of the coil and varying amounts of resistance cut into or out of the circuit as desired. This tap is connected by line 56 to a small resistance 58 and further by line 60 to a stationary electrode 62 which is positioned adjacent the surface of the sensitized paper and opposite the conductive plate 30. In other words, the paper flows between the electrode 62 and plate 30.

The lower extremity of the resistance 46 is connected by line 64 to one end of each of two transformer secondaries 66 and 68 through lines 70 and 72, respectively. The opposite end of each of these secondaries is connected by lines 74 and 76 to two further stationary electrodes 78 and 80 adjacent the electrode 62 and also opposite the conductive plate 30. These are all arranged substantially in horizontal alignment. Conductive plate 30 is also connected by line 82 to line 64 and through lines 70 and 72 to the opposite sides of the transformer secondaries.

The primaries 84 and 86 of the transformers are provided with power through three lines: 88, 90 and 92, the first of which is connected directly to one end of the welding transformer secondary 20, the second, or line 90, is connected to the incoming cable adjacent the welding tip 24, and the last line 92 is connected adjacent welding electrode 22. Line 88 has a switch member 94 therein, the opposite side of which is connected by line 96 to a resistor 98. Line 92 is also provided with a switch 100, the opposite side of which is connected by line 102 to a similar resistor 104, the opposite sides of the resistors being connected together by a common wire 106. Each of the resistors 98 and 104 has a sliding tap 108 and 110, respectively, which are connected to the outer terminals of the transformer primaries by lines 112 and 114. Line 90 might be considered the common wire for this system and is connected directly to lines 106 and the common line 116 of the transformer primaries.

The sensitive paper on the roll 28 is so constructed that when a certain critical potential difference is created therethrough or spark is caused to jump to the same, a small black or dark brown spot is formed thereon to indicate such a passage of current and this acts as a permanent record of the operation. It will thus be evident that when the potential on any one of the electrodes 78, 62 or 80 is raised to such a point as to cause a spark to jump to the conductive plate 30, a dot or record will be made.

The power for providing the necessary potential for the discharge is obtained across the various portions of the circuit as will be described, but first we shall describe in general which of the electrodes will give us the measurements of the various times. The electrode 78 will have a sufficient potential applied thereto when the machine is welding and this power or potential is provided by the potential drop between lines 88 and 90, or the potential drop in the incoming cable 118 to the welding electrode between the welding transformer secondary and one of the welding electrodes. Electrode 62 will be raised in potential to a sufficient degree to cause a mark to be made upon the paper during both the delay and the hold time of the cycle, this potential being provided by the potential difference across the open contacts of the control switch 8. This switch is of course open during both of these times. The electrode 80 will be energized during the off time and this potential will be provided by the potential difference between the two welding electrodes when they are open and no work is found between the points.

Having now thus generally summarized the operation, the circuits will be specifically traced. It should be noted, however, that all of the switches 52, 94, 100 and 42 are ganged together to operate simultaneously. Let us assume, therefore, that the switch 6 is closed and the automatic switch 8 is being operated by the conventional welding control to sequentially proceed through its ordinary or normal cycle, and if the machine is in its off period, which we should normally expect would come first, switch 8 will be open and the gang switch 52, 94, 100 and 42 will be closed to take measurements. Closure of switch 42 energizes motor 36 and the sensitized paper begins to feed over the conductive shoe 30. The transformer primary 86 will then be energized. Even with the switch 8 open a certain current will flow through the welding transformer primary 18 through the following circuit: incoming line 2, switch 6, resistor 44, member 12, tap 16, secondary 18, member 14, line 50, switch 52, resistor 46, line 48, incoming line 4. This will cause a small current to flow in the secondary 20 which will be applied to the primary 86 through the following circuit: secondary 20, line 90, line 116, primary 86, tap 110, portion of the resistor 104, line 102, switch 100, line 92, electrode 22 back to the secondary. This will of course induce the current in the transformer secondary 68, which it will be evident is directly connected between electrode 80 and the conductive plate 30, which will cause a spark to jump at the crest of each voltage cycle causing a series of dots to appear on the paper as it is drawn past the shoe.

When the work however is placed between the electrodes 22 and 24, the voltage between lines 90 and 92 will drop causing the cessation of marks on the paper between the electrode 80 and shoe 30 and increasing the secondary drain of the welding transformer. This will cause more current to flow in the primary circuit thereof and a larger voltage drop to appear on the resistor 46, increasing the potential of the electrode 62 to a sufficient degree to cause arcing between 62 and the shoe 30 and a series of dots will occur at this point throughout this portion of the cycle.

The switch 8 is then closed to perform the actual weld. This of course reduces the voltage across the resistor 46 and the arcing will cease from electrode 62 and at the same time a high current will be drawn by the weld. This will cause a substantial voltage drop in the portions of the conductor between the transformer secondary and one of the welding electrodes, namely, as shown between line 88 and 90, and the primary of the transformer 84 will be energized through a circuit as follows: line 118, line 88, switch 94, line 96, part of resistor 98, tap 108, line 112, primary 84, line 116, line 90, line 118.

It might be mentioned at this point that it might be obvious that the resistors 98 and 104 may be set at any desired tapped point by the movable arm 108 or 110 to give the proper voltage to their attendant primaries. The energization of the primary 84 will of course cause current to flow in the secondary 66 and a sufficient potential will be built up therein to cause arcing between the electrode 78 and the shoe 30 which will again cause a series of dots indicating one-half cycles on the sensitive paper as it passes.

At the end of the welding portion of the cycle switch 8 will again be opened, but there is still a work member clamped between the electrodes. Therefore, resistor 46 will again have a sufficient potential drop to cause electrode 62 to discharge to the shoe 30 and again cause a series of dots adjacent the center of the strip of paper as it is fed past.

It will thus be evident that the record graph produced by this device will be a series of lines formed of small dots spaced at different points transversely of the paper and while the electrode 62 is energized during two portions of the cycle, these portions are always spaced from each other by another interposed portion of the cycle and by figuring which portion of the cycle they follow it will be evident as to what portion they represent. For example, if the series of dots formed by electrode 62 immediately follow a series of dots formed by the electrode 78, which is that energized during the weld portion of the cycle, we know that the time indicated is the hold time, while if it follows a series of dots made by the electrode 80, it would be evident that this indicated delay time. Therefore, taking the resultant graph and counting the number of dots formed in each line we can find the number of half cycles of voltage incorporated in the total working cycle of the machine, and by their relative position transversely of the sheet it can be ascertained how long each portion of the cycle exists.

It will also be obvious that it is not necessary to make any change whatever in the existing set-up of the welding circuit, but only necessary to clamp to the system at various points the lines extending from the test circuit. These may be applied by clips which are fastened to the switch points or cables and may be merely clamped on and immediately removed following the test and in no way alter the set-up. In this way the tests may be made very rapidly. The device may be housed in a small case (not shown) with only external leads therefrom for the proper connections and a slot from which the paper is fed. It will also be readily seen that it may be applied to any other machine in which it is desired to ascertain time periods by clamping the leads to portions of the apparatus being tested to give voltage across the transformer primaries 84 and 86 and a drop through resistor 46. It may not be necessary to utilize all of these if there are not as many portions in the machine cycle to measure.

We claim:

1. In a recording device for measuring time periods of a cycle of a welding machine, a pair of welding electrodes, a supply line connected thereto, a transformer the secondary of which is connected to the supply line, a voltage input connected to the primary, a control switch in the input circuit, a resistance connected across the control switch, a pair of control transformers, a plurality of lines connecting the primaries of the last named transformers to various locations in the secondary welding circuit, a plate, a sensitive strip, means for continuously feeding the strip over the plate, a plurality of electrodes adjacent the strip on the opposite side from the plate, lines separately connecting one extremity of the resistance and each of the pair of transformer secondaries to one of the electrodes and a common line connected to the plate, the opposite side of the resistance and the opposite secondary connection on the pair of transformers whereby voltages developed across the three will be applied to the respective electrode and cause a discharge to the plate making a record on the sensitive paper therebetween.

2. In a recording device for measuring time periods of a cycle of a welding machine having electrodes, a supply transformer and input thereto, a plurality of lines connected to various locations in the welding circuit, a portion in the welding secondary circuit and a portion in the primary welding circuit, a plurality of transformers conencted to the lines first mentioned which are connected to the secondary welding circuit, a resistance connected to the primary lines, a series of recording electrodes connected to the resistance and to the transformers and a recording strip continuously fed past the electrodes whereby voltage variations in the welding circuit will develop voltage in the resistance and transformers which will be applied to the electrodes and recorded on the strip for a permanent record.

3. In a recording device for measuring time periods of a cycle of a welding machine having electrodes, a transformer, a primary control switch, comprising a second transformer connected across the welding electrodes, a third transformer connected across the welding transformer and an electrode, a resistance connected across the control switch, a plurality of recording electrodes, sensitive recording means adjacent the electrodes whereby as voltage differences appear between the various points indicated the transformers and resistance will apply the same to the recording electrodes and a record of the same will give a sequential time picture of the machine operation.

4. In a recording device for measuring time intervals of a machine circuit through a normal cycle of operation, a welding machine having a pair of electrodes, a transformer supplying current thereto, a control switch in the primary transformer circuit automatically operated, a plate, a sensitive strip on said plate, a plurality of recording electrodes adjacent the strip whereby when a sufficient voltage is applied thereto a spark will jump to the plate through the strip and cause a dot, means for continuously driving the strip on said plate, and means connecting said recording electrodes at various spaced points in the primary and secondary welding circuit whereby as the voltage differences between the selected points vary through the machine cycle different electrodes will have their voltages raised sufficiently to cause a spark to jump and a record to be made providing a complete record of time for the different portions of the cycle.

JACK OGDEN.
HAROLD B. WILKINS.